(12) United States Patent
Krämer et al.

(10) Patent No.: US 12,090,928 B2
(45) Date of Patent: Sep. 17, 2024

(54) MOTOR VEHICLE COMPRISING AN OPTICAL ENVIRONMENT SENSOR AND METHOD FOR OPERATING A MOTOR VEHICLE

(71) Applicant: AUDI AG, Ingolstadt (DE)

(72) Inventors: Stefan Krämer, Ingolstadt (DE); Marvin Raaijmakers, Ingolstadt (DE)

(73) Assignee: Audi AG, Ingolstadt (DE)

( * ) Notice: Subject to any disclaimer, the term of this patent is extended or adjusted under 35 U.S.C. 154(b) by 148 days.

(21) Appl. No.: 17/773,190

(22) PCT Filed: Feb. 10, 2021

(86) PCT No.: PCT/EP2021/053193
§ 371 (c)(1),
(2) Date: Apr. 29, 2022

(87) PCT Pub. No.: WO2021/223920
PCT Pub. Date: Nov. 11, 2021

(65) Prior Publication Data
US 2023/0093096 A1    Mar. 23, 2023

(30) Foreign Application Priority Data
May 6, 2020 (DE) .................. 10 2020 112 311.6

(51) Int. Cl.
*B60R 1/22* (2022.01)
*B60R 1/12* (2006.01)
(Continued)

(52) U.S. Cl.
CPC ................ *B60R 1/22* (2022.01); *B60R 1/12* (2013.01); *G01S 7/481* (2013.01); *G01S 17/88* (2013.01); *B60R 2001/1253* (2013.01)

(58) Field of Classification Search
CPC ..... B60R 1/22; B60R 1/12; B60R 2001/1253; G01S 7/481; G01S 17/88
(Continued)

(56) References Cited

U.S. PATENT DOCUMENTS

| 5,756,988 A | 5/1998 | Furuta |
| 7,230,640 B2 | 6/2007 | Regensburger et al. |

(Continued)

FOREIGN PATENT DOCUMENTS

| DE | 10114932 A1 | 10/2002 |
| DE | 102010047984 A1 | 4/2012 |

(Continued)

OTHER PUBLICATIONS

International Preliminary Report on Patentability directed to related International Patent Application No. PCT/EP2021/053193, completed Nov. 25, 2021, with attached English-language translation, 11 pages.

(Continued)

*Primary Examiner* — Mahmoud S Ismail
(74) *Attorney, Agent, or Firm* — Sterne, Kessler, Goldstein & Fox P.L.L.C.

(57) ABSTRACT

The present disclosure relates to a motor vehicle including at least one optical surroundings sensor which has a detection range in a detection direction. The motor vehicle further includes a deflection arrangement for the surroundings sensor. The deflection arrangement includes an optical arrangement configured to deflect the detection direction and the entire detection range, and an adjustment device configured to move the optical arrangement into and out of the detection range of the surroundings sensor.

20 Claims, 3 Drawing Sheets

(51) Int. Cl.
  *G01S 7/481* (2006.01)
  *G01S 17/88* (2006.01)
(58) Field of Classification Search
  USPC .......................................................... 701/301
  See application file for complete search history.

(56) References Cited

U.S. PATENT DOCUMENTS

| | | | |
|---|---|---|---|
| 9,964,758 | B2 | 5/2018 | Bayha et al. |
| 10,048,381 | B2 | 8/2018 | Koehler |
| 2019/0271769 | A1* | 9/2019 | Raly ..................... G01S 7/4814 |
| 2019/0277962 | A1 | 9/2019 | Ingram et al. |
| 2020/0064483 | A1 | 2/2020 | Li et al. |
| 2020/0156545 | A1* | 5/2020 | Sobecki .................... B60R 1/06 |
| 2021/0025983 | A1* | 1/2021 | Patil ................... G02B 27/0006 |
| 2021/0156971 | A1* | 5/2021 | Neustadt ............... G01S 7/4813 |
| 2022/0317306 | A1* | 10/2022 | Brem ..................... G01S 7/027 |

FOREIGN PATENT DOCUMENTS

| | | |
|---|---|---|
| DE | 102013011853 A1 | 1/2015 |
| DE | 102018006607 A1 | 2/2019 |
| DE | 102017009935 A1 | 4/2019 |
| DE | 102017222078 A1 | 6/2019 |
| EP | 3579014 A1 | 12/2019 |
| EP | 3650887 A1 | 5/2020 |
| JP | 2013060172 A | 4/2013 |

OTHER PUBLICATIONS

International Search Report and Written Opinion of the International Searching Authority directed to related International Patent Application No. PCT/EP2021/053193, completed May 21, 2021, with attached English-language translation; 18 pages.

* cited by examiner

MOTOR VEHICLE COMPRISING AN OPTICAL ENVIRONMENT SENSOR AND METHOD FOR OPERATING A MOTOR VEHICLE

TECHNICAL FIELD

The disclosure relates to a motor vehicle having at least one optical surroundings sensor which has a detection range in a detection direction. The disclosure also relates to a method for operating a motor vehicle.

BACKGROUND

Environment detection is playing an increasingly important role in modern motor vehicles. To this end, surroundings sensors are used in modern motor vehicles in order to detect the surroundings of the motor vehicle. This is particularly important in the case of driver assistance functions that can issue warning security instructions and/or are even designed to trigger driving interventions. In particular at high speeds, driver assistance systems, in particular those that are designed for at least partially automatic operation of the motor vehicle, require a detection in the front space over a wide range for comfortable and safe operation. An example of this is the so-called "highway pilot" which can combine adaptive longitudinal driving functions and/or lane change functions, for example. At a recommended speed of 130 km/h, a stationary obstacle must be detectable at a distance of several hundred meters in order to achieve collision-free standstill. In another example, for a safe lane change at the potentially possible differential speeds on expressways, for example German highways, several hundred meters detection coverage in the rear space of the motor vehicle are also necessary in order to be able to recognize a conflicting road user in the target lane in good time before the lane change begins.

For such far-range detection tasks, Lidar sensors are ideal for implementing such technologies, since they can achieve a relatively high angular resolution and detection coverage. In many currently proposed motor vehicles, however, the integration of Lidar sensors is limited to the front of motor vehicles with an orientation towards the region in front of the vehicle. This means that the region behind the motor vehicle, i.e. the rear space, cannot be covered by high-resolution Lidar sensors.

DE 101 14 932 A1 relates to a vehicle-compatible, high-resolution 3D detection of the surroundings of a road vehicle with sensors that detect the surroundings. In this case, it is proposed to use a two-dimensional distance-resolving sensor arrangement in order to generate a three-dimensional image of the surroundings from two-dimensional distance profiles detected in this way, which distance profiles were measured in succession. In one embodiment, it is proposed to deflect a portion of the beams from the distance sensor into another spatial region so that two beam paths are used simultaneously, wherein a beam path deflected to the side is used to determine the relative position of the road vehicle with regard to its surroundings.

DE 10 2017 222 078 A1 relates to an arrangement and a method for an arrangement and a vehicle headlight. The arrangement should have a light source for a lighting system and a radiation source for a sensor system for detecting the surroundings. In this case, the light source is followed by an adaptive mirror arrangement, via which the light emitted by the light source can be steered. The radiation from the radiation source for the sensor system is to be coupled via the adaptive mirror arrangement into the path of the white useful light of a headlight. Infrared radiation used by a Lidar system can be projected into the distance via a MEMS mirror to detect the surroundings.

DE 10 2010 047 984 A1 relates to a deflection mirror arrangement for an optical measuring device and a corresponding optical measuring device. The deflection mirror arrangement should comprise a mirror unit, which is arranged on a rotatable axis in order to create a scanning laser scanner, by means of which the detection range is scanned successively.

BRIEF DESCRIPTION OF THE DRAWINGS/FIGURES

DETAILED DESCRIPTION

Figure 1:
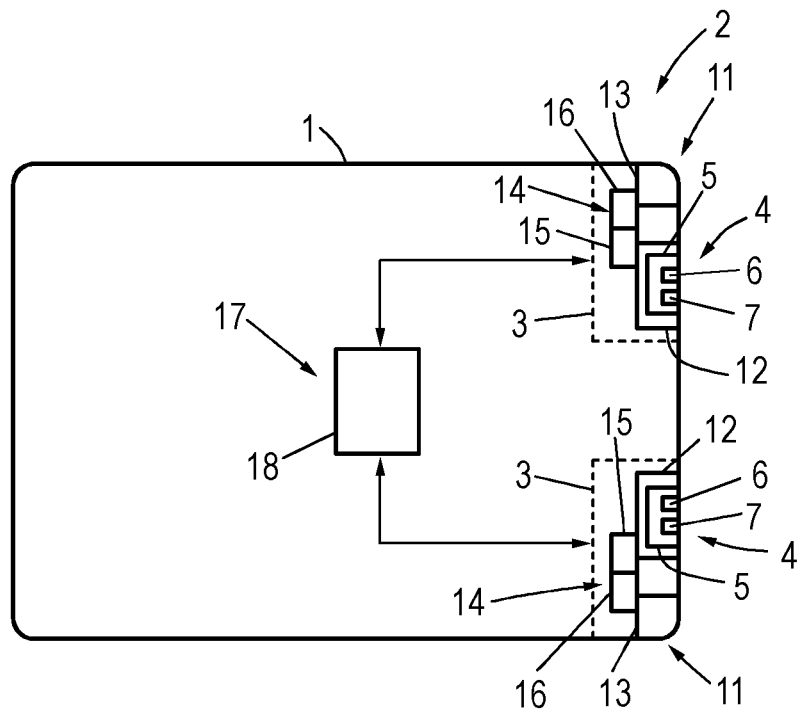
FIG. 1 is a schematic diagram of a motor vehicle, according to some embodiments of the present disclosure.

The disclosure is based on the object of specifying an option for more versatile use of an optical surroundings sensor, which option is implemented in a way that protects the surroundings sensor.

To achieve this object, in a motor vehicle of the type mentioned at the outset, the motor vehicle further has a deflection arrangement for the surroundings sensor, where the deflection arrangement includes an optical arrangement for the deflection of the detection direction and the entire detection range, and an adjustment device for optionally moving the optical arrangement into and out of the detection range of the surroundings sensor.

According to the disclosure, an augmentation or expansion of a surroundings sensor system, preferably a Lidar system, is therefore proposed in that an optical arrangement comprising one or more optical elements, in particular mirrors, is used in order to selectively change the cone of vision, i.e. the detection range, of the surroundings sensor overall. This optical arrangement can be introduced in a targeted manner via an adjustment device into the detection-relevant beam path, i.e. the detection range, if a deflection of the detection direction and thus of the entire detection range is required. If the base detection range, which is given without an optical arrangement, is to be used again, the optical system can be removed from the detection-relevant beam path and thus from the detection range again by controlling the adjustment device. In this way, at least two different alignments of the detection range of the surroundings sensor are provided by means of the optionally usable optical arrangement.

In some embodiments, the detection direction of the surroundings sensor is aligned without the use of the optical arrangement on the region in front of the motor vehicle, in particular at least substantially parallel to or along the longitudinal axis of the vehicle, wherein the at least one deflected detection direction is aligned toward the rear space of the motor vehicle, in particular at least substantially parallel to or along the longitudinal axis of the vehicle, and/or toward a side region of the motor vehicle, in particular at least substantially parallel to or along the transverse axis of the vehicle. In other words, the surroundings sensor can therefore basically be aligned with the region in front of the motor vehicle. By adding the deflection arrangement, such a front-facing surroundings sensor system can be manipulated in such a way that it can also cover regions behind and/or next to the motor vehicle when the optical arrangement is introduced into the detection-relevant beam path.

With particular advantage, the basic detection properties of the surroundings sensor are also not changed, which means that the optical arrangement is designed to deflect the detection direction, leaving the detection range geometrically unchanged. In this way, for example, a Lidar sensor can deliver sensor data that is to be evaluated in a directly comparable manner and substantially in the same way both from the region in front and from the rear space. In other words, the surroundings sensor provides the same, complete, evaluable sensor data, only from a differently oriented detection range.

In the following, many embodiments will relate to the use of a Lidar sensor as a surroundings sensor, since the surroundings sensor is a Lidar sensor in some embodiments. However, the concept described here can also be applied to other optical surroundings sensors, such as cameras.

It should also be noted at this point that the surroundings sensor designed as a Lidar sensor can also have a number of sensor heads, to which different detection ranges with correspondingly different detection directions can be assigned, which means that the sensor heads can be aligned differently. In such a case, the deflection arrangement can be designed in such a way that it only affects one of the detection ranges, but the detection directions of both or generally a plurality of detection ranges of the Lidar sensor are influenced by the optical arrangement, if they are placed in the corresponding detection-relevant beam path, wherein, in particular, a different and/or even independently adjustable change in the detection direction for different detection ranges of the Lidar sensor is conceivable. Considering a Lidar sensor as an example, which has two sensor heads, in particular a close-range head and a far-range head, in some embodiments, at least the detection range of the far-range sensor head is deflected, wherein the detection range of the close-range sensor head can remain unchanged, can be deflected in the same way as the detection range of the far-range sensor head, and/or can be deflected in a different way than the detection range of the far-range sensor head, which is achieved by a corresponding design of the optical arrangement which can then in particular have separate optical elements, in particular mirrors, for the sensor heads.

The optical arrangement preferably comprises at least one mirror, it also being possible for all optical elements, i.e. optically effective elements, to be designed as mirrors. In this case, there is then a mirror arrangement as the optical arrangement. In a Lidar sensor, one or more mirrors are therefore used, which deflect the light pulses of the Lidar sensor or specifically the sensor head, in order to change the detection range of the Lidar sensor.

In addition to the more flexible use of the surroundings sensor, in particular the Lidar sensor, the use of an additional, sensor-external deflection arrangement has the advantage that the fragile sensor system is not mechanically stressed compared to a rotation of the entire surroundings sensor, and the installation position of the surroundings sensor remains fixed. Furthermore, the original detection configuration can be restored extremely quickly if necessary by removing the optical arrangement, for example by folding it up or the like.

Although the original detection range (basic detection range) is no longer covered by the surroundings sensor due to the optical deflection of the detection-relevant beam path, in particular the beam deflection by mirrors, the high visual ranges discussed at the outset are also not consistently necessary from a functional point of view, in particular for driver assistance functions. In one example, with an overtaking assistance function, for example in a highway pilot, it can be assumed that this is usually triggered by a slow vehicle in front that is already so close to one's own motor vehicle, such that reliable detection and tracking by the remaining surroundings sensors of the motor vehicle is also possible, for example by a close-range sensor head of the Lidar sensor, is ensured by radar sensors and/or a camera, so that the far-range sensor head of the Lidar sensor can be used to monitor the target lane to the rear without any problems. In another exemplary application, it is also conceivable, for example, to detect traffic approaching in urban use at an intersection in good time by the deflection of the detection range from the left or right.

In general, it can therefore be expedient within the scope of the present disclosure if the surroundings sensor has a detection coverage of at least 100 m in the deflectable detection range. This is particularly relevant if, in addition to monitoring the region in front of the motor vehicle, the detection of the rear space of the motor vehicle is also to be carried out. For this purpose, the disclosure, as described, provides a deflection arrangement arranged externally to the surroundings sensor, i.e. in particular outside the sensor housing, in order to direct the transmission and reception signal in particular in a Lidar sensor into further regions, in particular into a rear space of the motor vehicle.

In a specific embodiment of the present disclosure, it can be provided that the motor vehicle has at least one driver assistance system that evaluates the sensor data from the surroundings sensor and has a control device, wherein the control device is designed for situation-dependent use of the deflection arrangement by controlling at least the adjustment device. The situation can be a driving situation of the motor vehicle and/or an operating situation of the driver assistance system. In particular, the situation can comprise the presence of a specific operating state of the driver assistance system, for example reversing, a situation during an overtaking maneuver, and the like. The driver assistance system can in particular be a driver assistance system designed for at least partially automatic driving of the motor vehicle, which driver assistance system is therefore able to carry out automated driving interventions with regard to the longitudinal driving and/or the lateral driving. For example, the driver assistance system can be a longitudinal driving system and/or a lane change assistance system and/or an intersection assistance system, or the driver assistance system can comprise such a system. In particular, the driver assistance system can be what is known as a highway pilot, which can automatically control the entire operation of the motor vehicle on a highway or other expressway within certain system limits, in particular by integrating an adaptive cruise control (ACC system) and a lane change assistant. For example, based on the data available from the surroundings sensor and other surroundings sensors, a highway pilot cannot only regulate to a specific travel speed and/or road users ahead, but also initiate an overtaking maneuver or specifically a lane change.

The control device can be designed for intermittent and/or continuous deflection of the detection direction during a situation-related deflection period. This means that while a situation exists, i.e. for the duration of a situation-related deflection time period, a continuous deflection can take place, so that only sensor data from the deflected detection range is available. However, it is also conceivable, for example, to use the base detection range and the at least one deflected detection range alternately, for example for periods of the same length in each case. For example, sensor data from the region in front of the motor vehicle and the rear space of the motor vehicle can be obtained cyclically.

In some embodiments, the optical arrangement has at least one actuator that can be controlled by the control device depending on the situation and/or the adjustment device has sub-devices that can be controlled independently by the control device depending on the situation, for setting different deflected detection directions. In other words, different deflected detection directions and thus different deflected detection ranges can be provided. For this purpose, either optical elements of the optical arrangement that can be changed via actuators can be provided, for example mirrors that can be removed from the detection-relevant beam path and/or rotatable mirrors, and/or the adjustment device can comprise sub-devices, for example at different points on the vehicle body, which can be controlled independently. In an exemplary configuration, a first sub-device of the adjustment device can extend or fold out at least a first optical element of the optical arrangement directly in front of the surroundings sensor, while a further sub-device is provided in a corner region of the motor vehicle and can optionally introduce at least one further optical element of the optical arrangement into the detection-relevant beam path already diverted by the at least one first optical element. For example, if the surroundings sensor is aimed at the region in front of the motor vehicle, the first portion of the optical arrangement, and therefore the at least one first optical element, can deflect the detection range, for example, to the side of the motor vehicle, in particular in the direction of the transverse axis of the vehicle. If no other optical element follows, the detection range is deflected to the side. However, if the second portion of the optical arrangement, i.e. the at least one additional (second) optical element, is introduced into the detection-relevant beam path, for example at the corresponding front corner of the motor vehicle, the detection range is deflected to the rear, i.e. to the rear space of the motor vehicle, i.e. past the own motor vehicle. Similar configurations can of course also be achieved with optical elements of the portion to which corresponding actuators are assigned.

In some embodiments, at least one driver assistance system is or comprises a longitudinal driving system and/or a lane change assistance system and the non-deflected detection direction of the surroundings sensor is directed towards the region in front of the motor vehicle, wherein the optical arrangement for the deflection of the detection direction is formed on the rear space of the motor vehicle. Such a driver assistance system can in particular be a highway pilot. However, the disclosure can also be used expediently in lane change assistance systems, in particular also overtaking assistance systems, alone and/or in longitudinal driving systems, for example ACC systems with a security function, in order, at high speeds of the motor vehicle, to provide wide detection both for the region in front of the motor vehicle and, if the situation requires, for the rear space. For example, it can be provided that the control device is designed to control the deflection arrangement for the deflection of the detection direction when an intention to change lanes is detected. For example, when recognizing a slow-moving road user in front of one's own motor vehicle and the resulting intention to change lanes on a multi-lane expressway, in particular a highway, it can be useful to check whether a relevant motor vehicle is present in the adjacent lane which is the target lane.

In another embodiment of the present disclosure, at least one driver assistance system is or comprises an intersection assistance system and the non-deflected detection direction of the surroundings sensor is directed towards the region in front of the motor vehicle, wherein the optical arrangement for the deflection of the detection direction is formed in at least one lateral direction. In this way, traffic approaching from the left and/or right at an intersection, in particular also an urban intersection, can be detected in good time. Both configurations, i.e. deflection in a lateral direction and into the rear space, can of course also be implemented, for example via the described actuators of the optical arrangement and/or the sub-devices of the adjustment device.

In some embodiments, the adjustment device is designed to extend and/or fold out the optical arrangement from a basic position recessed in the vehicle body into a deflection position. In this way, the optical arrangement that is only required in a specific situation, i.e. not particularly frequently, can be recessed into the vehicle body on the one hand and positioned in a protected manner, but on the other hand this is done in such a way that the visual impression of the motor vehicle is impaired as little as possible and/or the streamlined nature of the vehicle body is maintained in the normal state. In this context, it is particularly advantageous if the optical arrangement is arranged in the basic position behind a flap that can be opened by the adjustment device and/or by a movement of the optical arrangement. A flap of this type can have the color of the surrounding vehicle body, for example, and thus allows the optical arrangement to be accommodated in the basic position in a concealed and particularly protected manner. It is generally particularly preferred within the scope of the present disclosure if the optical arrangement is folded out and in mechanically, since this allows the optical arrangement to be made available and removed very quickly. However, it is also possible, for example with authorization, to extend the optical arrangement, with this of course also applying to sub-devices, as described above, for both configurations. Specifically, the deflection arrangement can be understood, for example, as a type of mechanical, additional, extendable side mirror for the surroundings sensor.

In addition to the motor vehicle, the present disclosure also relates to a method for operating a motor vehicle according to the disclosure, which is characterized in that the adjustment device for the deflection of the detection direction by moving the optical arrangement into the detection range of the surroundings sensor is controlled if at least one deflection condition evaluating a current driving situation of the motor vehicle and/or a current operating situation of a driver assistance system is met. All embodiments relating to the motor vehicle according to the disclosure can also be transferred to the method according to the disclosure, so that the advantages already mentioned can also be obtained with these.

Further advantages and details of the present disclosure will become apparent from the embodiments described below and with reference to the drawings.

FIG. 1 shows a schematic diagram of a motor vehicle 1 according to the disclosure. The motor vehicle 1 has a Lidar system 3 in its front region 2 on the left and right side of the front, each of which has a Lidar sensor 5 as a surroundings sensor 4. In the present case, each of the Lidar sensors 5 has two sensor heads, namely a close-range sensor head 6 and a far-range sensor head 7. Although the sensor heads 6, 7 are shown next to one another in the schematic illustration in FIG. 1, in practice they are arranged one above the other, as will be explained in more detail below.

Figure 2:
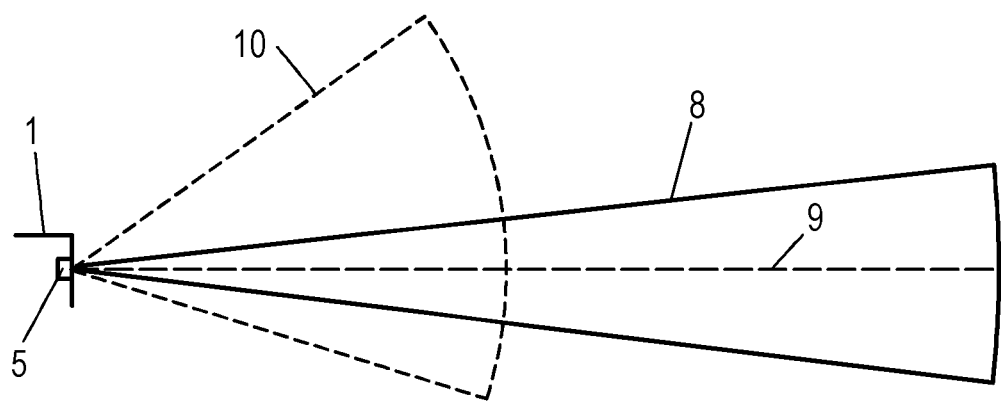
FIG. 2 shows detection ranges of a Lidar sensor of the motor vehicle, according to FIG. 1.

The detection ranges resulting for the sensor heads 6, 7 are shown schematically in FIG. 2. In the detection direction 9, which in the present case runs parallel to the longitudinal axis of the vehicle, there is a narrow detection range 8 for the far-range sensor head 7, where the detection range however has a detection coverage of more than 100 m.

The detection range 10 of the close-range sensor head 6 has a clearly smaller detection coverage, but a larger aperture cone. In addition, the detection direction is slightly transverse.

As is also shown schematically in FIG. 1, the Lidar systems 3 further comprise an optical arrangement 11, which in the present case comprises a first portion 12 in the region of the respective Lidar sensor 5 and a second portion 13 in the corresponding corners of the motor vehicle. An adjustment device 14 is assigned to the optical arrangement 11 which in the present case also has a first sub-device 15 for the first portion 12 and a second sub-device 16 for the second portion 13. Both sub-devices 15, 16 can be controlled independently. By means of the respective sub-devices 15, 16, the adjustment device 14 introduces the respective portions 12, 13 of the optical arrangement 11 into the detection range 8 which is assigned to the far-range sensor head 7. This means that the first portion 12, which is basically recessed in the vehicle body of the motor vehicle 1, can be extended and/or folded out so that at least one optical element of the first portion 12, in this case a mirror, is positioned in the detection-relevant beam path for the transmitted and received signals of the far-range sensor head 7. The at least one optical element of the first portion 12 then changes the detection direction 9 from the basic detection direction 9 shown in FIG. 2 and deflects the entire detection range 8 from the basic detection range shown in FIG. 2, in such a way that it meets the position of the correspondingly extended second portion 13, also comprising at least one optical element, in this case again a mirror. This further optical element deflects the detection direction 9 and thus the detection range 8 completely, in the present case in the direction of the rear space of the motor vehicle 1, as will be explained in more detail below.

The motor vehicle 1 further has at least one driver assistance system 17, in this case by way of example a highway pilot and/or an intersection assistance system, the functions of which are implemented in a control unit 18. The control unit 18 evaluates sensor data from the Lidar sensors 5 and is also designed to control the Lidar systems 3, specifically the adjustment devices 14 in particular.

Figure 3:
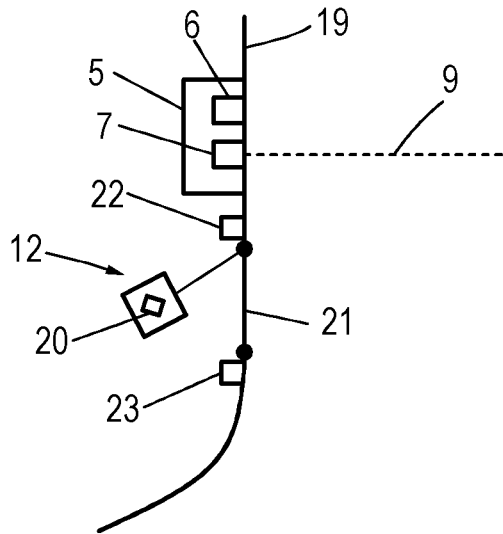
FIG. 3 is a detailed view of the vehicle body in the region of the Lidar sensor in a first operating state, according to some embodiments of the present disclosure.
Figure 4:
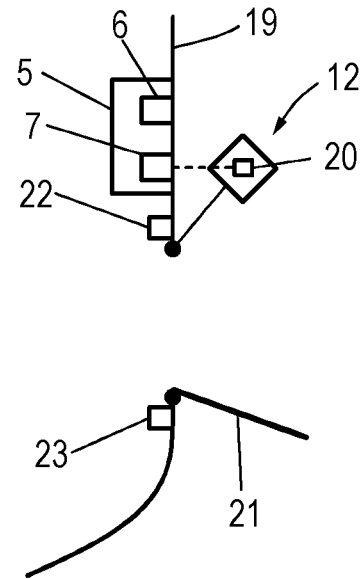
FIG. 4 is the detailed view of FIG. 3 in a second operating state.

FIGS. 3 and 4 show detailed views of the vehicle body 19 of the motor vehicle 1 in the region of a Lidar sensor 5 for a more detailed explanation of an embodiment of the adjustment device. The first portion 12 of the optical arrangement 11 is mounted pivotably on the vehicle body 19 in the present case and has a mirror 20 as the optical element. FIG. 3 shows a basic state in which the first portion 12 is arranged in a recessed manner in the body 19 behind a flap 21 which is also attached to the vehicle body 19 in a pivotable manner. Both the first portion 12 and the flap 21 are assigned actuators 22, 23 of the sub-device 15 of the adjustment device 14. If the actuators 22, 23 are controlled accordingly to pivot the first portion 12 and the flap 21, the first portion 12 and thus the mirror 20 are introduced into the detection-relevant beam path of the far-range sensor head 7 (see FIG. 4), so that the detection direction 9 is deflected accordingly, in this case into or out of the drawing plane. As can be seen, however, the detection-relevant beam path of the close-range sensor head 6 is not impaired, so that the detection range 10 remains unchanged. However, embodiments are also conceivable in which the detection range 10 can also be deflected.

The second portions 13 and the second sub-devices 16 can have a corresponding design with regard to the vehicle body 19. Of course, other configurations are also generally conceivable in this case, for example a mechanically driven adjustment corresponding to a predetermined driving path (linear adjustment) and the like. Furthermore, it is also conceivable that the flap 21 is actuated without an actuator 23 by the corresponding portion 12, 13 itself.

Figure 5:
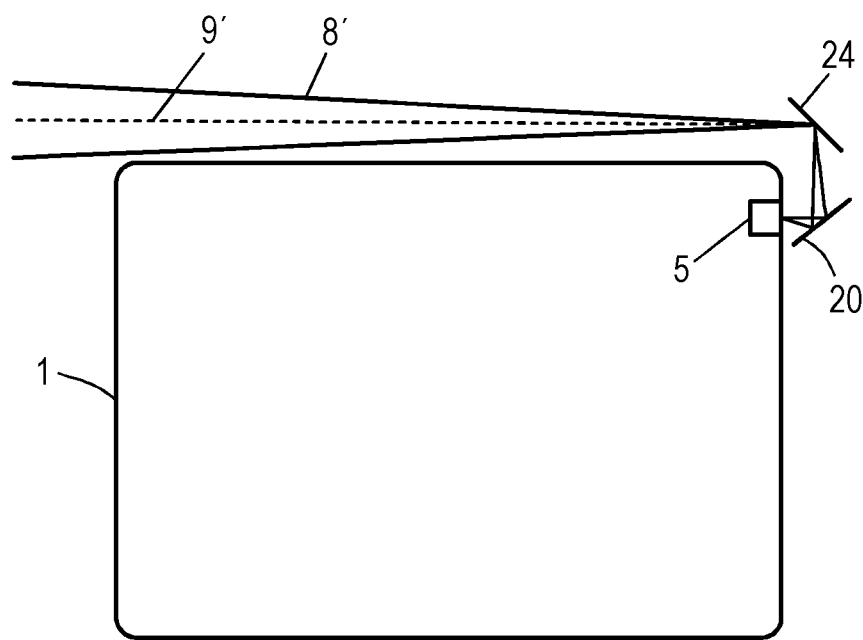
FIG. 5 shows a first option for the deflection of a detection range, according to some embodiments of the present disclosure.
Figure 6:
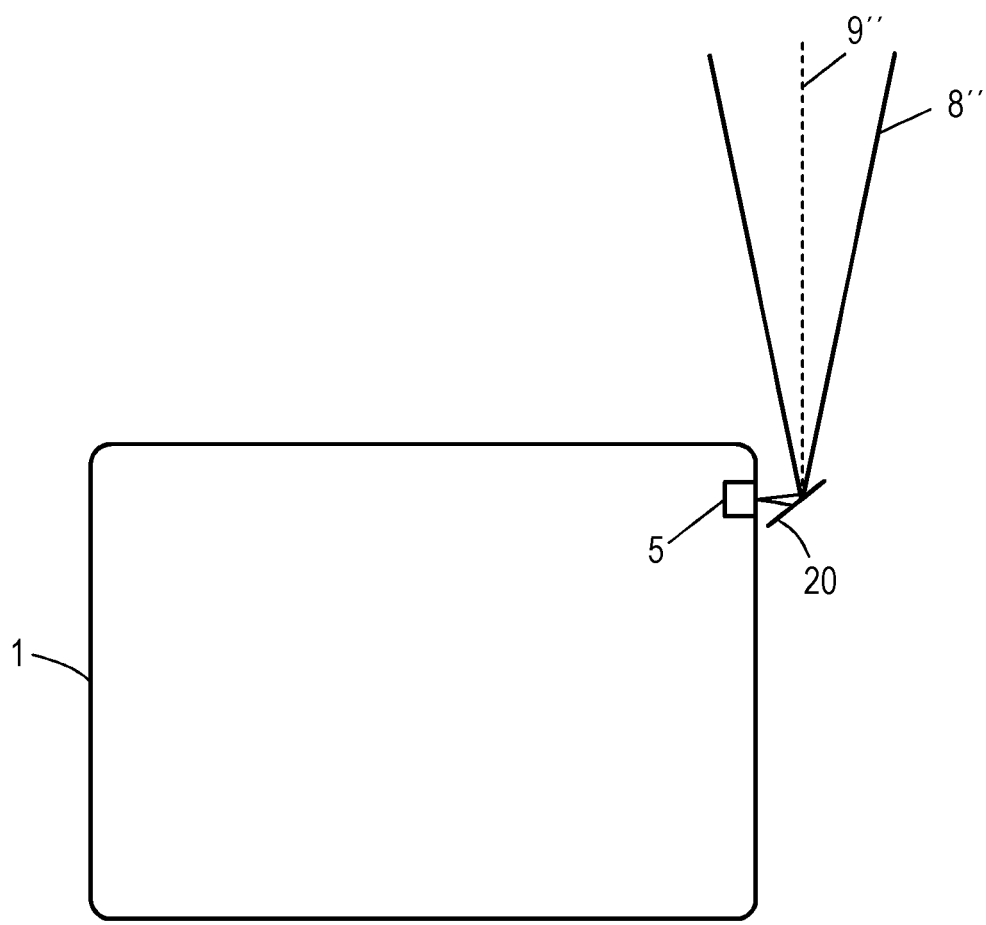
FIG. 6 shows a second option for deflection of a detection range, according to some embodiments of the present disclosure.

FIGS. 5 and 6 show options for the deflection of the detection range 8 in this embodiment. If the control device 18 establishes, for example, that there is an intention to change lanes to an adjacent lane on the left, it controls the adjustment device 14 in such a way that both portions 12, 13 of the optical arrangement 11 are folded out into the deflection position. This means, see FIG. 5, that the mirror 20 and also the mirror 24 of the second portion 13 are located in the detection-relevant beam path of the far-range sensor head 7 of the Lidar sensor 5, so that the deflected detection direction 9' and the deflected detection range 8' result according to FIG. 5. In this case, detection takes place past the motor vehicle 1 in the rear space of motor vehicle 1, in particular also in the target lane adjacent to the left, and it can be determined whether a relevant road user is located there.

FIG. 6 shows an embodiment in which the motor vehicle 1 is located at an urban intersection. In this case, the control device 18 specifically controls only the sub-device 15 of the adjustment device 14 for moving the first portion 12 into the deflection position, so that a deflection to the side, namely parallel to the transverse axis of the vehicle, takes place and the deflected detection range 8" is aligned with the deflected detection direction 9", so that approaching motor vehicles and other road users can be detected from the left of the intersection.

In an alternative configuration, if the optical arrangement 11 consists of only one portion, and therefore all the optical elements of the optical arrangement 11 are moved simultaneously from the basic position to the deflection position by the adjustment device 14, a configuration is also conceivable in which at least a part of the optical elements, in the example the mirror 24, is assigned an actuator, via which the mirror 24 can be brought into a passive position outside of the detection-relevant beam path. Furthermore, configurations are of course also conceivable in which a larger number of deflected detection ranges and detection directions are possible due to such actuators of the optical arrangement 11.

The invention claimed is:
1. A motor vehicle, comprising:
an optical surroundings sensor having a detection range in a detection direction; and
a deflection arrangement for the optical surroundings sensor, the deflection arrangement comprising:
an optical arrangement configured to deflect the detection direction and the detection range; and an adjustment device configured to move the optical arrangement into and out of the detection range of the surroundings sensor, wherein:
  the adjustment device is configured to extend or fold out the optical arrangement from a basic position recessed in a vehicle body of the motor vehicle into a deflection position; and
  the optical arrangement is arranged, in the basic position, behind a flap and is configured to be opened by the adjustment device or by a movement of the optical arrangement.

2. The motor vehicle according to claim 1, wherein, without using the optical arrangement, the detection direction of the optical surroundings sensor is aligned to a region in front of the motor vehicle, parallel to or along a longitudinal axis of the motor vehicle.

3. The motor vehicle according to claim 1, wherein a deflected detection direction is aligned toward a rear space of the motor vehicle, parallel to or along a longitudinal axis of the motor vehicle.

4. The motor vehicle according to claim 1, wherein a deflected detection direction is aligned toward a side region of the motor vehicle, parallel to or along a transverse axis of the motor vehicle.

5. The motor vehicle according to claim 1, wherein the optical surroundings sensor is a Lidar sensor or a camera.

6. The motor vehicle according to claim 5, wherein the Lidar sensor comprises a close-range sensor head and a far-range sensor head, and the optical arrangement is configured only to deflect a detection range of the far-range sensor head.

7. The motor vehicle according to claim 1, wherein the optical arrangement comprises a mirror.

8. The motor vehicle according to claim 1, further comprising:
  a driver assistance system that evaluates sensor data from the optical surroundings sensor; and
  a control device designed for situation-dependent use of the deflection arrangement through controlling the adjustment device.

9. The motor vehicle according to claim 8, wherein the optical arrangement comprises an actuator controlled by the control device for setting different deflected detection directions based on a situation.

10. The motor vehicle according to claim 8, wherein the adjustment device comprises sub-devices independently controlled by the control device for setting different deflected detection directions based on a situation.

11. The motor vehicle according to claim 8, wherein the driver assistance system comprises a longitudinal driving system or a lane change assistance system, wherein a non-deflected detection direction of the optical surroundings sensor is directed towards a region in front of the motor vehicle, and the optical arrangement to deflect the detection direction is formed on a rear space of the motor vehicle.

12. The motor vehicle according to claim 11, wherein the control device is designed to control the deflection arrangement to deflect the detection direction when an intention to change lanes is detected.

13. The motor vehicle according to claim 8, wherein the driver assistance system comprises an intersection assistance system, wherein a non-deflected detection direction of the optical surroundings sensor is directed towards a region in front of the motor vehicle, and the optical arrangement to deflect the detection direction is formed in a lateral direction.

14. The motor vehicle according to claim 1, wherein the optical arrangement is configured to deflect the detection direction while keeping the detection range geometrically unchanged.

15. A method for operating a motor vehicle, comprising:
  controlling an adjustment device to deflect a detection direction of a surrounding sensor by moving an optical arrangement into a detection range of the surroundings sensor based on a deflection condition that evaluates a current driving situation of the motor vehicle or a current operating situation of a driver assistance system:
    extending or folding out the optical arrangement by the adjustment device from a basic position recessed in a vehicle body of the motor vehicle into a deflection position; and
    opening the optical arrangement by the adjustment device or by a movement of the optical arrangement from the basic position behind a flap.

16. The method according to claim 15, further comprising:
  aligning a non-deflected detection direction of the surroundings sensor to a region in front of the motor vehicle, parallel to or along a longitudinal axis of the motor vehicle.

17. The method according to claim 15, further comprising:
  aligning a deflected detection direction toward a rear space of the motor vehicle, parallel to or along a longitudinal axis of the motor vehicle.

18. The method according to claim 15, further comprising:
  aligning a deflected detection direction toward a side region of the motor vehicle, parallel to or along a transverse axis of the motor vehicle.

19. The method according to claim 15, further comprising:
  deflecting only a detection range of a far-range sensor head when the surroundings sensor comprises a close-range sensor head and the far-range sensor head.

20. The method according to claim 15, further comprising:
  evaluating, by a driver assistance system, sensor data from the surroundings sensor; and
  controlling the adjustment device by a control device designed for situation-dependent use of a deflection arrangement of the motor vehicle.

* * * * *